(12) United States Patent
Elliott et al.

(10) Patent No.: US 6,438,376 B1
(45) Date of Patent: Aug. 20, 2002

(54) WIRELESS COMMUNICATIONS MANAGEMENT AND CONTROL SYSTEM USING MOBILE STATION POSITION AND MOVEMENT INFORMATION

(75) Inventors: Stephen B. Elliott, Allen; Srinivas Eswara, Carrollton; Jill R. Baumann, Wylie; Daniel Carter, Plano, all of TX (US)

(73) Assignee: Nortel Networks Limited, St. Laurant (CA)

( * ) Notice: Subject to any disclaimer, the term of this patent is extended or adjusted under 35 U.S.C. 154(b) by 0 days.

(21) Appl. No.: 09/309,543

(22) Filed: May 11, 1999

Related U.S. Application Data

(60) Provisional application No. 60/084,925, filed on May 11, 1998.

(51) Int. Cl.$^7$ ................................................ H04Q 7/20
(52) U.S. Cl. ........................................ 455/437; 455/440
(58) Field of Search ................................ 455/436, 437, 455/440, 441, 456, 444, 524, 525, 443; 370/331, 332, 333

(56) References Cited

U.S. PATENT DOCUMENTS

| 5,396,647 A | * | 3/1995 | Thompson et al. | .......... 455/440 |
| 5,640,676 A | * | 6/1997 | Garncarz et al. | ........... 455/436 |
| 5,893,033 A | * | 4/1999 | Keskitalo et al. | ........... 455/440 |

* cited by examiner

*Primary Examiner*—Nguyen T. Vo
(74) *Attorney, Agent, or Firm*—Carr Law Firm, L.L.P.

(57) ABSTRACT

The present invention incorporates information representing the location and movement of a mobile station in a wireless telecommunications network to manage and control handoffs, reduce the risk of falsing, prioritize channel assignments and control the power level of channels.

3 Claims, 6 Drawing Sheets

MOBILE STATION
CHANNEL ASSIGNMENT QUEUE

| PRIORITY | RISK | SPEED |
|----------|------|-------|
| MS 4 | HIGH | HIGH |
| MS 2 | LOW | HIGH |
| MS 5 | LOW | HIGH |
| MS 1 | HIGH | LOW |
| MS 7 | HIGH | LOW |
| MS 3 | LOW | LOW |
| MS 6 | LOW | LOW |

FIG. 11
MATRIX 240
| | | CHANNELS | | | | |
|---|---|---|---|---|---|---|
| | | 1 | 2 | 3 | ... | n |
| Q U A D R A N T S | A | QI=5.0 PL=3 NEXT=3 | ... | ... | ... | ... |
| | B | ... | ... | ... | ... | ... |
| | C | ... | ... | ... | ... | ... |
| | D | ... | ... | ... | ... | ... |
| | ... | ... | ... | ... | ... | ... |
| | WW | ... | ... | ... | ... | ... |
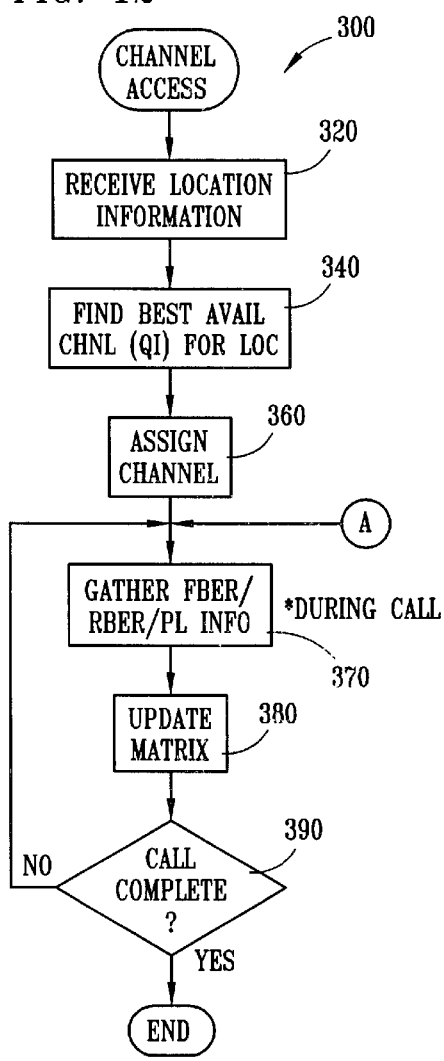
FIG. 12
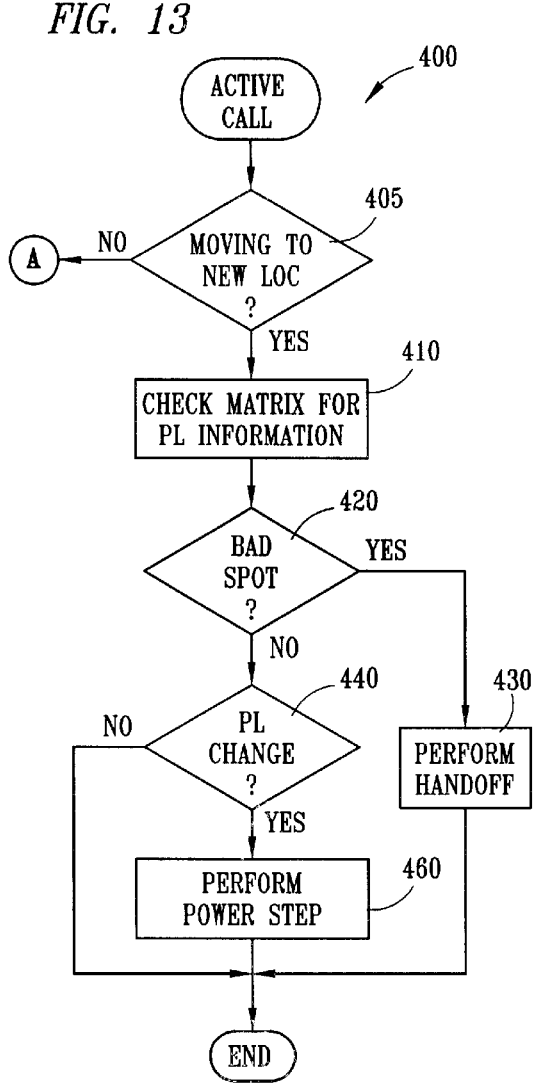
FIG. 13

WIRELESS COMMUNICATIONS MANAGEMENT AND CONTROL SYSTEM USING MOBILE STATION POSITION AND MOVEMENT INFORMATION

This application claims the benefit of U.S. Provisional Application No. 60/084,925, filed May 11, 1998.

TECHNICAL FIELD

The present invention relates to management and control of mobile telephone communications and, in particular, to use of information representing one or more of the location, speed and direction of travel of mobile stations to reduce the instances of call disruption and enhance the quality of service.

BACKGROUND

Mobile telephone systems rely on a variety of management and control techniques to provide simultaneous services to large numbers of mobile stations, even though the spectrum of radio frequencies available for this purpose is quite limited in a relative sense. Each of the multitudes of mobile telephones in use at any given moment in a mobile system must be allowed to communicate with the stationary, ground-based network separately from others. However, insufficient room exists across the spectrum of radio frequencies available for all users to utilize a separate radio frequency to conduct a conversation or data transmission.

The most basic management and control technique used universally by mobile systems is to provide an array of adjacent "cells" that separate the use of any given radio frequency by distance. While the cells cover the service area like patches in a quilt, each cell employs a set of radio frequencies or channels to communicate with mobile stations within the cell that are different from the set of frequencies used by immediately neighboring or adjacent cells. In this way, each cell contributes to separation by distance of frequency sets of other cells around it. This separation therefore allows frequencies to be reused throughout the array of cells, generally without overlap or interference. Separate calls can be made by different users over the same frequency in different cells spaced sufficiently apart. Each cell may also be further subdivided into sectors, each using separate sets of frequencies or channels. Three sectors are typically used in a cell.

The number of mobile users serviced and the capacity of the system are increased further by dividing each frequency used within a cell or sector into a number of separate time slots. Each mobile phone operating on that frequency or frequency band is assigned a separate time slot in which to broadcast transmissions to the base transceiver station (BTS) within its cell. The BTS broadcasts to the mobile station in a similar manner, sometimes on the same and sometimes on a different frequency. Thus, a number of mobile stations can use the same frequency to communicate with the same BTS within the cell, separately and without interference. This sort of division of frequencies into time slots or intervals is widely known as Time Division Multiple Access (TDMA).

Other techniques for providing access to the mobile system by multiple users within the same cell are Frequency Division Multiple Access (FDMA) and Code Division Multiple Access (CDMA). Each technique is well-known by persons who are skilled in the field of mobile telecommunication systems and therefore need not be discussed in more detail.

Maintaining substantially continuous communication with a mobile station as it moves from one cell or sector to another and a high quality of service (QOS) are objectives to which existing systems aspire. Achieving these objectives would result in service similar to that provided by land-line communication networks that do not rely on radio or other electromagnetic transmission. Meeting these objectives, however, in FDMA and TDMA systems is hampered by the need to change the frequency or channel through which a mobile station communicates as it travels into an adjacent cell or sector within a cell. In general, the terms "cell" and "sector" are often used interchangeably; however, their meanings differ in the sense that cells are formed by different BTSs, while sectors share the same BTS and together form a larger cell. Because the adjacent cell or sector operates using different sets of frequencies to avoid interference, the mobile station must adjust to the frequency environment of the cell or sector into which it travels. This sort of adjustment is known as a "hard hand-off."

In TDMA systems, this inter-cell (adjacent cells) or intra-cell (adjacent sectors) "hand-off" of the traveling mobile station to the adjacent cell or sector is made more difficult by the need to synchronize the time slot in which the mobile station transmits and receives "bursts" of signals to and from the associated BTS. This time slot adjustment is required to avoid interfering with the transmission bursts of other mobile stations operating over the same frequency. In addition to resetting the time slot assignment, when a mobile station travels from a servicing cell to a target cell having radii appreciably different, the transmission of the mobile station must be retarded or advanced to compensate for a different transmission or "propagation" delay in transmissions to the BTS of the target cell. This burst transmission adjustment compensates for any appreciable difference in the transmission propagation delay resulting from different lengths of the transmission paths to the BTS of the prior serving cell and the new target cell. Under existing standards, such burst transmission adjustments are necessary for approximately every 500 meter difference in transmission distance; however, circumstances may make adjustments based on other increments desirable.

Because existing TDMA systems currently do not determine this distance in advance of the hand-off, transmission to and from the mobile station must be temporarily interrupted or "muted" while the mobile station transmits small bursts of synchronization codes to the BTS of the target cell, in accordance with IS-54B and IS-13 standards. The BTS determines the correct burst advance or retard to be implemented and transmits the information to the mobile station, which completes the adjustment. This muting avoids undesirable burst collisions with other mobile stations operating on the same channel or frequency while the adjustment is made. Unfortunately, an undesirable consequence is that the mobile station user is temporarily disconnected from any communication and typically hears a "click" noise. Therefore, it would be desirable to provide a management and control system that adjusts the burst transmission of the mobile station in connection with the hand-off with less disruption of communication.

Other difficulties experienced with current TDMA management and control systems during hand-off stem from system determinations of what new frequency of the target cell or sector to assign a mobile station. Mobile stations operating with systems employing the Mobile Assisted Hand-off (MAHO) procedure of the IS-136 standard frequently monitor the strength of the Digital Control Channels (DCCHs) of immediately adjacent cells (as distinguished from the traffic or voice channel or frequency) and provide this information to the BTS of the currently serving cell.

Using this information, the BTS communicates to the mobile station its preferred DCCH assignment and adjustment in the target cell.

However, mobile stations sometimes incorrectly monitor a stronger DCCH signal of a cell that is not immediately adjacent, but that is of the same frequency as a DCCH of an adjacent cell. This often occurs due to shielding of the adjacent cell DCCH by buildings in urban areas, for example. Such a "false" readings will result in a dropped call as the hand-off is made to the incorrect, unavailable or unacceptably weak DCCH of the actual target cell. It is therefore desirable to provide an ability to distinguish or eliminate such "false" readings.

When a target cell or cell sector does not have available a frequency or channel for one or more mobile stations moving into that cell or sector, each station is placed by the management and control system in a "queue," while awaiting availability of a channel. Placement of a mobile station in the "queue" by the system for such inter- or intra-cell hand-off and channel assignment, is triggered primarily by a reduction of signal strength of the BTS to a predetermined level.

However, such reliance on signal strength sometimes undesirably causes the broadcast of the cell serving the mobile station to be "dragged" into the target cell and perhaps other adjacent cells during inter-cell hand-offs, particularly when the mobile station is traveling quickly relative to other mobile stations in queue. This is caused by the serving cell BTS increasing the power level of its transmission to maintain contact with the mobile station. The resulting intrusion of dragged transmission into the adjacent cells violates principals of frequency reuse and separation, and also causes other problems, such as false readings of a non-adjacent DCCH. In intra-cell, sector-to-sector hand-offs, the strength of signals broadcast by the directional beam antennae of a sector attenuates more rapidly as the sector boundary is approached. It is therefore desirable to provide an ability to hand-off channel assignments more rapidly to those mobile stations having a greater need for such an assignment.

As a mobile station travels within a cell or sector, differences in local topography, buildings, fading effects, noise sources and the like often cause attenuation of or interference with signals reaching the station, due to shadows, reflections, multipath and the like. Undesirable degradation of the Quality of Service (QOS) results. Current systems typically compensate for these signal losses by increasing the power level of the channel, in response to frequent monitoring of the channel power level received by the mobile station and feedback by the mobile station to the BTS. However, this power level adjustment is usually completed only after the QOS reduces, to an extent noticeable to the mobile station user. It is therefore desirable to compensate for, reduce or substantially eliminate QOS degradation caused by such geographical differences.

SUMMARY OF THE INVENTION

The foregoing difficulties and needs are addressed by the present invention, which enhances wireless systems management, control and quality of service. Information representing the geographic position of a mobile station is provided to the system for the purpose of advancing or retarding transmissions to the BTS of a target cell or sector during a hand-off. Use of this information reduces or avoids the muting period currently needed to allow synchronization of the mobile station transmissions to the target cell or sector.

In another aspect, information representing the position of the mobile station is used to distinguish transmissions of adjacent cells from non-adjacent cells.

This reduces or substantially avoids false readings of channels of non-adjacent cells in a hand-off procedure.

In still another aspect, information representing one or more parameters of the position, speed and direction of travel are used to adjust the priority of target cell channel assignment amongst two or more mobile stations requiring a hand-off to a target cell or sector.

This more rapidly assigns new channels to those mobile stations having a more urgent need and reduces the number of dropped calls during hand-off.

In yet another aspect, information representing the position of a mobile station is used to anticipate or predict the power level requirements at two or more, and preferably many, locations within a cell or sector. The position information can also be used to reassign the mobile station to a channel that is preferable for use in the location of the mobile station. These adjustments and assignments can be made with reference to quality of service data obtained and correlated to position information as the mobile station travels during active calls.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 is a matrix illustrating an array of data and other information relating to quality of service, power level and location of a mobile station in accordance with the invention;

FIG. 12 is a flow diagram illustrating channel assignment and collection of information relating to quality of service and location of a mobile station in accordance with the invention;

FIG. 13 is a flow diagram illustrating adjustment of power level and collection of power level information from a mobile station in accordance with the invention.

DETAILED DESCRIPTION

FIGS. 1 through 6 illustrate methods and means for facilitating the hand-off of an active call between adjacent cells or sectors, utilizing information representing the position of an associated mobile station relative to the target cell or sector.

Figure 1:
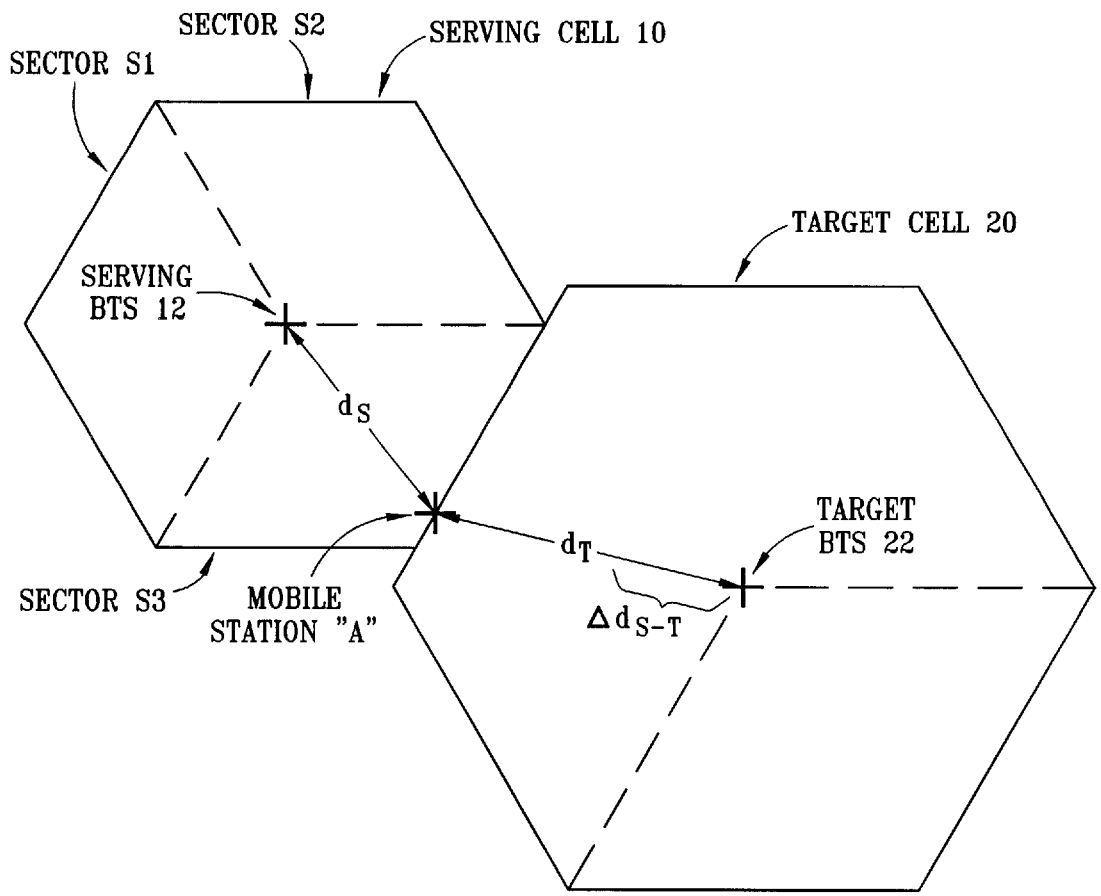
FIG. 1 is a schematic illustration of a serving cell and target cell implementing one embodiment of the invention in a hand-off.
Figure 2:
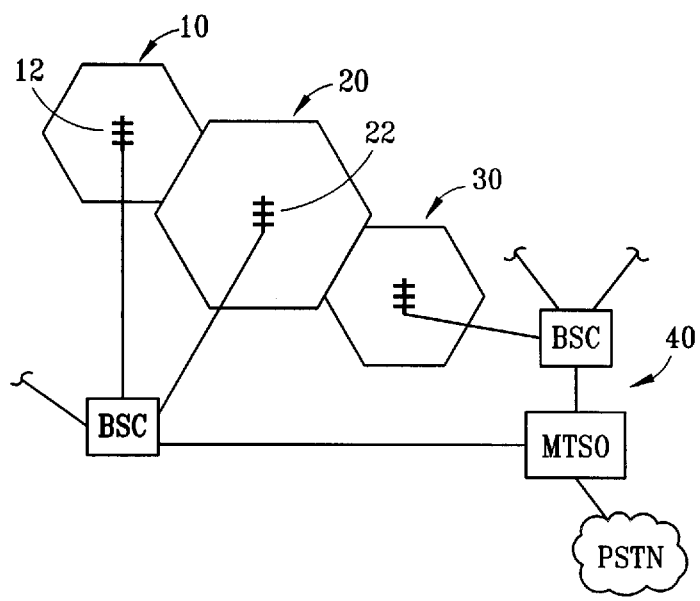
FIG. 2 is a schematic illustration of a wireless telecommunications network incorporating the embodiments of the invention.

Referring to FIGS. 1 and 2, there is shown schematically three adjacent cells 10, 20 and 30 used to communicate with one or more mobile stations in a wireless telecommunications network 40. In an actual network, other cells not shown in FIGS. 1 and 2 would be positioned adjacent the cells, to provide substantially contiguous coverage of the surrounding area. While only three cells are shown to simplify description of the invention it will be apparent that the invention contemplates use in two or more cells within a wireless telecommunications network. Furthermore, the invention is described in a network 40 employing TDMA management and control technology as well as IS-54b and IS-136 standards. However, it should also be apparent that aspects of the invention may be employed with other management and control systems.

Shown in FIGS. 1 and 2 are a serving cell 10 and a target cell 20 implementing a hand-off of mobile station A from cell 10 to cell 20 during an active call. That is, the hand off occurs while the mobile station A is communicating voice or data over the traffic channel to the serving BTS 12 of cell 10. During the hand-off, communication with mobile station A over the traffic channel is transferred from serving BTS 12 to the target BTS 22 of tarqet cell 20. In addition to transferring communication of the traffic channel, communication of management and control information between the mobile station A over the DCCH channel is also transfer to target BTS 22.

Upon completion of the hand-off, communication between mobile station A over both the traffic and DCCH channels continues with the target BTS 22 and the target cell 20. It will be apparent that management and control of the mobile station A during a hand-off is accomplished through signaling between the mobile station and the servicing BTS over the traffic channel. The traffic channel is separate from the DCCH channel and is normally used to transmit voice and data to or from the user of the mobile station and the party with whom the user intends to talk, exchange data or otherwise communicate.

As is illustrated schematically, the diameter and coverage area of serving cell 10 is substantially smaller than those of target cell 20. This disparity is often implemented to accommodate differences in the number of users frequenting each cell, topography covered by each cell and other factors affecting the quality of service within the coverage area of each cell. Moreover, the management and control system may vary the size and coverage areas of adjacent cells, to handle additional traffic loads imposed by increased number of users or calls during the busy hour, for example.

FIG. 2 is a schematic diagram of primary management and control components of the wireless telecommunications network 30, of which the serving cell and the target cell 20 are part. In general, lower-level management and control of the cells 10 and 20, such as frequency and time-slot assignment, propagation delaying alignment and the like, necessary during a hand-off, are accomplished by the base station controller (BSC) serving the cells 10 and 20. However, hand-offs made between cells that are not served by the same BSC, such as between cells 20 and 30, typically employ at least one mobile telephone switching office (MTSO), shown linked by access lines to the BSC controlling each of the cells 20 and 30. Each MTSO is in turn linked to a public switched telephone network (PSTN), through which the wireless telecommunications network 30 communicates with land-line telephones and other customer premises equipment, nodes, switches, points of presence, systems and the like.

During hand-off of mobile station A at or near the schematically represented boundary of the serving cell 10 and the target cell 20, the delay in propagation of transmissions to the target BTS 22 changes abruptly. In other words, signals transmitted from the mobile station A take longer to reach the target BTS 22, because the distance over which the transmissions must travel abruptly increases with the hand-off. More specifically, target BTS 22 is located a distance dt from mobile station A appreciably greater than the distance ds separating the mobile station A from the serving BTS 12. The difference in propagation distances from mobile station A to serving BTS 12 and target BTS 22 is represented by Ads-t. The disparity of propagation delay between serving and target cells, in general, is proportionate to the disparity in the size of the cells and, more particularly, their radius and area of coverage.

In TDMA management and control systems, adjustment of the timing of transmissions by mobile stations as they transition from one cell to the next during a hand-off sequence must be completed to compensate for such propagation delay changes. If the timing alignment is not so adjusted, the mobile station will be unable to properly synchronize its transmission with the correct time-slot assigned for transmission to the target BTS.

Figure 3:
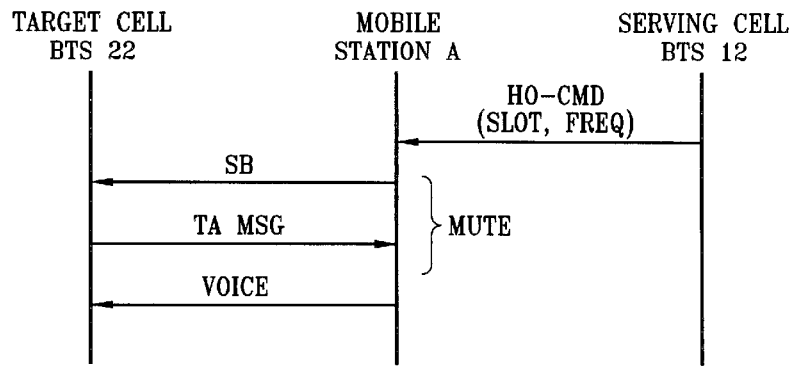
FIG. 3 is a diagram illustrating the signaling sequence of a prior art wireless telecommunications network during a hand-off.

FIG. 3 illustrates the signaling sequence used in prior art TDMA management and control systems to hand-off an active call of mobile station A from the serving cell 10 to the target cell 20. As the mobile station A approaches the boundary between the cells 10 and 20, a hand-off command (HO-CMD) is sent from the serving cell BTS 12 signaling the mobile station A to initiate a signaling sequence in short burst format with the target cell BTS 22. The hand-off command is triggered by a determination within the BSC or MTSO associated with the BTS 12 that the signal strength received by the BTS 12 or mobile station A has attenuated to a predetermined level. Information is sent from the serving cell BTS 12 to the mobile station A with the hand-off command, representing the time slot and frequency assignment for the traffic channel of mobile station A within the target cell 20.

The mobile station A then discontinues transmission to the serving cell BTS 12 and begins transmission to the target cell BTS 22 in shortened bursts over the channel assignment received from the serving cell BTS 12, until the propagation delay adjustment or alignment is completed, synchronizing the normal bursts of traffic channel transmission with the target cell BTS 22 and consequently other mobile stations within the target cell 20 to avoid burst collisions or other disruption of other calls within the target cell 20. Voice or data transmission to and from the mobile station A is disrupted or muted during the shortened burst period and is often accompanied by an undesirable "click."

Such synchronization is achieved in the prior art by a sequence of signaling over the digital traffic channel (DTC) to advance or retard, if necessary, transmission bursts of both the traffic channel and DCCH control channel. Short bursts (SB) of synchronization codes are sent by the mobile station A to the target cell BTS 22, allowing a determination by the management and control system of the propagation delay and corresponding time alignment necessary for synchronization. A time alignment message (TA MSG) is returned to the mobile station A from the BTS 22. The test short burst transmission is next set by the mobile station A to the BTS 22 and, if synchronized appropriately with the assigned time slot of the mobile station A, a reset command is returned from the BTS 22, confirming the time alignment advance or retard. The mobile station A then begins its normal burst transmissions over the traffic channel in the target cell 20 with this adjustment.

Figure 4:
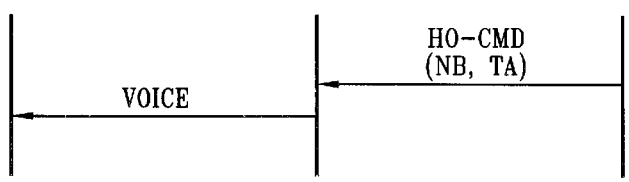
FIG. 4 is a diagram illustrating the signaling sequence of a wireless telecommunications network incorporating an embodiment of the invention.

FIG. 4 illustrates a signaling sequence in which information representing the location of mobile station A is used to adjust the time alignment (TA) of mobile station A, substantially eliminating the need for short burst transmission over the traffic channel during hand-off, such as is required by the prior art. This is accomplished by sending with the hand-off command (HOCMD) the propagation delay time alignment (TA) required to synchronize transmissions of mobile station A with target BTS 22. Sending the time alignment information prior to hand-off allows the mobile station A to transmit voice and data over the traffic channel in synchrony with the target BTS 22, without the exchange of synchronization signaling and associated shortened burst transmissions. Also substantially avoided is the associated muting of the traffic channel to prevent burst collisions with other transmissions over the same frequency until the synchronization is completed. Although some disruption of transmission over the traffic channel will be occasioned as the mobile station A adjust frequency and time-slot alignment to synchronize with the target BTS 22, the effect will be unperceivable.

Information representing at least the approximate location of mobile station A relative to the target BTS 22 at the time hand-off is triggered can be obtained by employing a number of available techniques. Preferably, location information will be obtained from a GPS receiver coupled to or co-located with mobile station A. One such mobile telephone, available from Garmin International, Inc. of Olathe, Kansas, operates with AMPS technology and includes a GPS receiver and transmits accurate location information in substantially real-time to an associated BTS. Short Message Service (SMS) available in IS-136 systems can also be used to transmit location information from mobile station A. Triangulation techniques, such as time delay of arrival, can also be utilized to assess the position of mobile station A has well. Other techniques will also be apparent to those skilled in art.

Information representing the approximate location of mobile station A at the time of hand-off is processed with data or other information representing the location of the target BTS 22, to determine the propagation delay.

Data or other information representing the location of the target BTS 22, preferably as well as the BTS of other cells in the network 40, is readily available for inclusion in a database, look-up table or other suitable memory resident in a data processor or distributed processing system of the management and control system of the network 40. The location determination first calculates or obtains from a memory source the propagation distance dt of transmissions from the mobile station A to the target and BTS 22. Information representing dt is then used to determine the propagation delay P, using the formula: P=dt/c, where c is a time-constant representing the speed of transmission signals.

Figure 5:
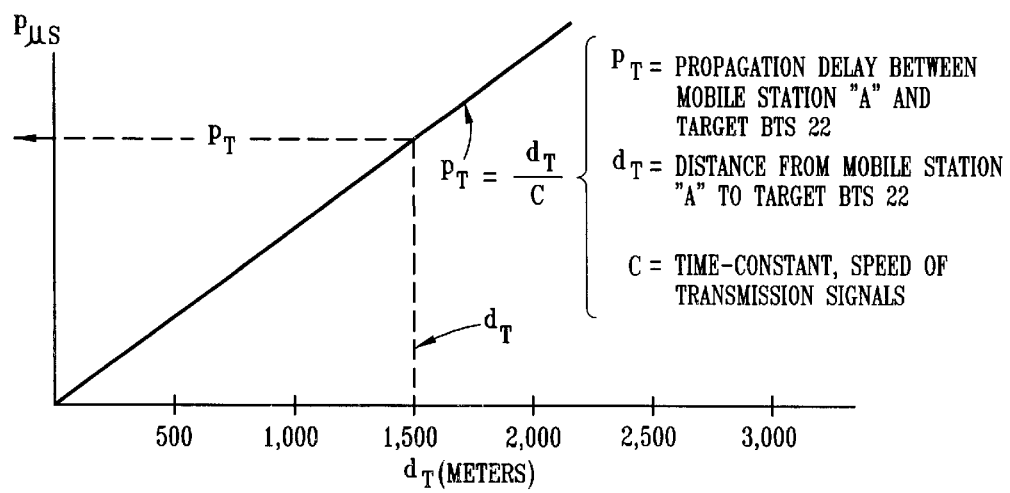
FIG. 5 is a diagram illustrating the relationship between propagation delay, distance and speed of transmission used to accomplish a hand-off in accordance with an embodiment of the invention.

FIG. 5 illustrates determination of the propagation delay Pt of the mobile station A by the management and control system with respect to the target cell 20 of the wireless telecommunications network 40, utilizing information representing the position of mobile station A. This propagation delay Pt, or time delay of arrival, can be converted by one or more data processors of the management and control system to time alignment units that are communicated to the mobile station A along with a hand-off command during the hand-off. Information representing the time alignment is specified in units of half-symbols.

As is well-known, there are 972 symbols in a 40 ms TDMA frame. This yields a conversion factor of 20.5 us per half-symbol. The propagation delay P is divided by the conversion factor of 20.5 us or micro seconds per half-symbol to yield the number of half-symbols transmitted to mobile station A to effect the desired advance or retard of transmission burst timing. It will be apparent that the timing of such transmission bursts will be advanced in hand-offs made from a smaller serving cell to a larger target cell. Conversely, the timing will be retarded in hand-offs made from a larger serving cell to a smaller target cell.

Figure 6:
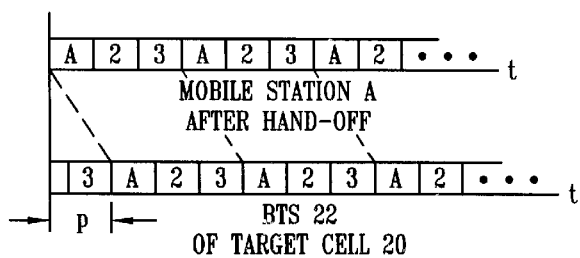
FIG. 6 is a diagram illustrating an adjustment of time alignment of transmissions in a hand-off accomplished in accordance with the invention.

FIG. 6 shows a set of two time-lines illustrating the time alignment (t) of normal burst transmissions over the traffic channel by the mobile station A to the target BTS 22 following hand-off from serving BTS 12 in FIGS. 1 and 2. The transmission of signals over the traffic channel by mobile station A are identified in by the letter "A" and are synchronized with the time-slots 2 and 3 of other mobile stations 2 and 3 (not shown) concurrently engaged in active calls within the cell 20 to avoid burst collisions with those calls As hand-off to the target cell 20 is initiated by the management and control system of the network 40, a hand-off command and time alignment adjustment information is transmitted to the mobile station A via the DTC channel, as shown in FIG. 4. Upon receiving the hand-off command and timing adjustment signal, mobile station A advances the transmission of normal bursts to synchronize with time-slots 2 and 3 assigned to mobile stations 2 and 3 (not shown) engaged in active calls to the target BTS 22. This adjustment is accomplished without the need of short burst transmissions by the mobile station to determine and accomplish the time alignment adjustment necessary to compensate for a different propagation delay Pt of the transmissions between mobile station A and the BTS 22 of target cell 20. Muting of the traffic channel of mobile station A during the propagation delay adjustment is also greatly diminished or eliminated as well.

Figures 7, 8:
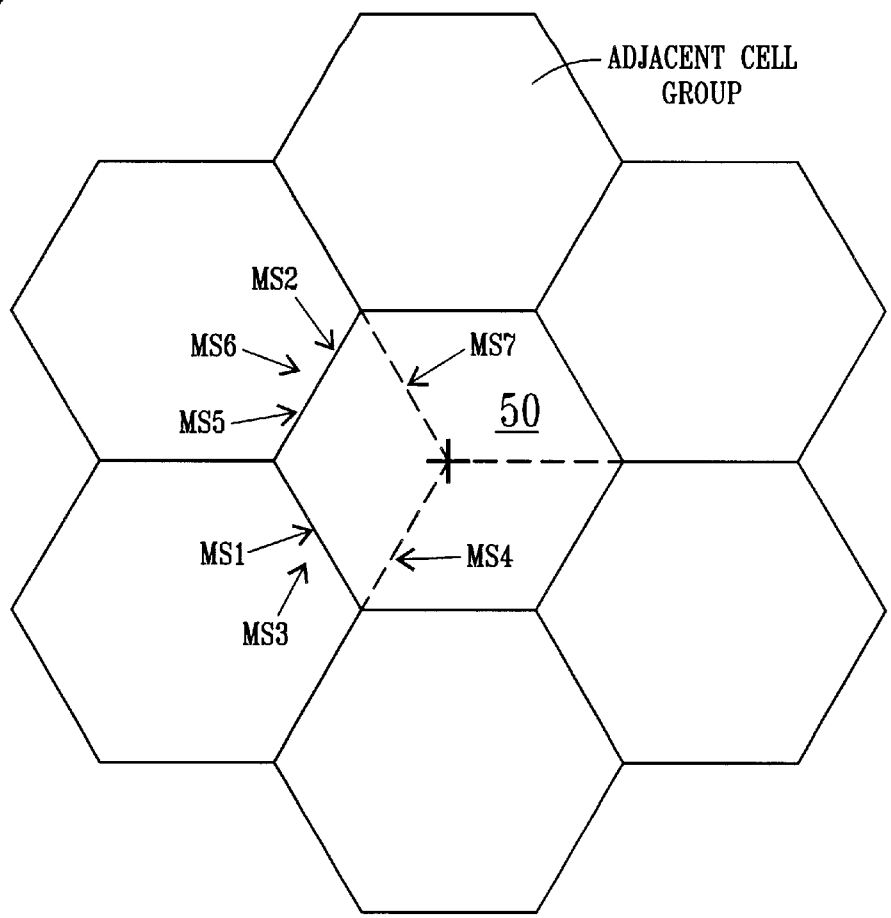
FIG. 7 is a diagram illustrating the need for an assignment of channels to mobile stations attempting to obtain a hand-off into a new cell or sector in accordance with the invention.
FIG. 8 is a table illustrating the assignment of 30 priority to a number of mobile stations seeking hand-off into a cell or sector in accordance with the invention.

Referring now to FIGS. 7 and 8, illustrated is a method and means of prioritizing of mobile stations awaiting channel assignments within a sector TS of a target cell 50, using information representing the position, direction and speed of the mobile stations competing for hand-off and transfer of service. For purposes of example only, seven mobile stations MS 1, MS 2, MS 3, MS 4, MS 5, MS 6 and MS 7 sequentially request hand-off of active call into the target sector ST of the target cell 50. Each mobile station is shown approaching sector TS of the target cell 50, and is awaiting assignment of available traffic channels. An arrow associated with each of the mobile stations MS 1 through MS 7 indicates the direction of travel of each mobile station. The geographical position or location of each of mobile stations MS 1 through MS 7 is indicated by the arrowhead. Because no channels are available within the sector ST, mobile stations MS 1 through MS 7 must the placed in a queue or list, assigning to the mobile stations an order of priority in which each will receive successive channels that become available. It will be apparent that such prioritization can be implemented with two or more mobile stations awaiting channel assignments.

The location, position and speed of each of the mobile stations MS 1 through MS 7 is determined in real-time by the wireless telecommunications network 40, employing any equipment and techniques described previously with reference to mobile station A. The order in which the hand-off and associated channel assignments of each of the waiting mobile stations MS 1 through MS 7 is prioritized based on both the risk of dropping their respective calls and speed at which each mobile station is approaching the target sector ST.

The risk of dropping a call of any of the mobile stations MS 1 through MS 7, such as by losing signal to or from the mobile station, is determined by the BTS of the cell servicing the mobile station. This determination is made by comparing the contour maps of the radio frequency coverage area of the cell and the direction of travel of the mobile station. For example, for a sector cell such as target cell 50, the contour maps would show that movement of the mobile station in a radial direction with respect to the serving BTS and the broadcast directional beam results in the signal level falling gradually with distance. This corresponds with a "low" risk of losing the signal and dropping the call.

In FIG. 7, mobile stations MS 1, MS 2, MS 3, MS 5 and MS 6 are shown generally moving in a radial direction away from the serving BTS of the cell in which each is leaving. However, movement of the mobile station in a lateral direction within the serving cell results in a relatively steeper rate of signal strength degradation, as the mobile station moves away from the center of the directional beam serving the sector and towards the boundary of an adjacent sector. This corresponds with a "high" risk of losing signal and dropping the call before the channel in the target sector is assigned and the hand-off is completed. In FIG. 7, mobile stations MS 4 and MS 7 are shown moving laterally, towards the target sector ST.

The position of the mobile station with respect to the target cell may also be used to determine and assign a "high" risk rating. For example, MS 1 in FIG. 7 would receive a "high" risk rating even though its direction of travel is radial with respect to the serving BTS, because its position is determined to be approximately at the boundary of the target cell 50. A "high" risk rating for mobile stations positioned at approximately the boundary of primarily adjacent cells and also adjacent sectors reduces the risk of dropped calls as well as reduces the chance of dragging a frequency serving the mobile station into an adjacent cell as the power level is increased by the serving BTS to maintain quality of service of the active call.

The speed rating of either "high" or "low" is also given to each of the mobile stations MS 1 through MS 7. When a hand-off request is received for each of the mobile stations MS 1 through MS 7, information representing the speed of the mobile station is compared with a speed set by the management and control system of the network 40, to designate the speed of mobile station as being either "high" or "low". In the example of FIGS. 7 and 8, mobile stations traveling at a speed of greater than 20 kilometers per hour are designated as traveling at "high" speed, while mobile stations traveling at less than 20 kilometers per hour are designated as traveling at "low" speed.

The risk and speed ratings or designations applied by the serving cells of each of the mobile stations MS 1 through MS 7 are used to determine and assign priorities of channel assignments, implementing a Boolean logic table shown in FIG. 8. The order of each of the mobile stations MS 1 through MS 7 in the channel assignment queue is determined with the greatest weight given to a "high" speed rating and the next greatest weight given to a the "high" risk rating. Therefore, MS 2 and MS 5 are placed in a higher level of priority within the queue than are MS 1 and MS 7. Also, as between mobile stations having the same combination of risk and speed ratings, those making earlier requests for a hand-off are placed ahead of those making later requests. Therefore, MS 2 is placed ahead of MS 5; MS 1 is placed ahead of MS 7; and MS 3 placed ahead of MS 6.

The hand-off prioritization described with reference to FIGS. 7 and 8 is accomplished using data processing and memory located at or distributed amongst the BSCs and MTSOs servicing the mobile stations the must be placed in queue or other appropriate location in the management and control system of the network 40. Information representing the boundaries of serving and target cells and sectors may be accessed from databases, lookup tables and other suitable forms of memory employed by the network 40.

Figure 9:
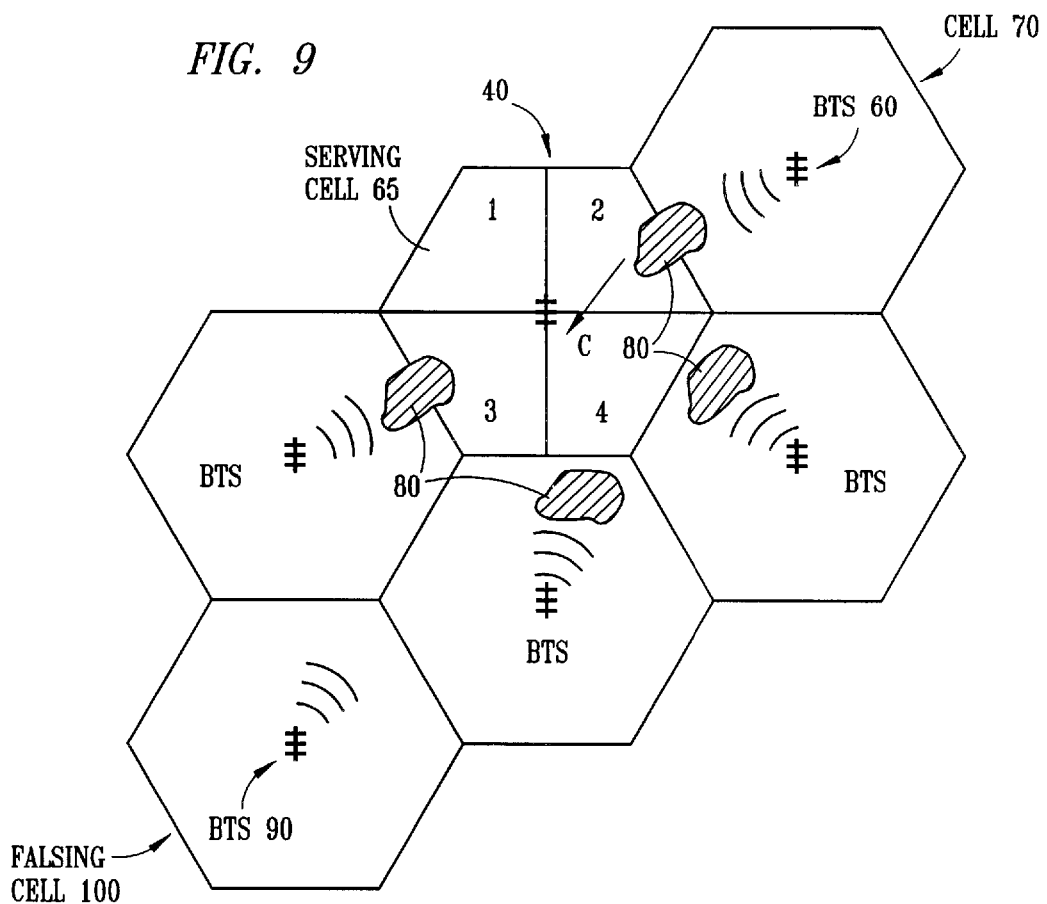
FIG. 9 is a diagram illustrating avoidance of incorrect selection and monitoring of frequencies of non-adjacent channels in accordance with the invention.
Figure 10:
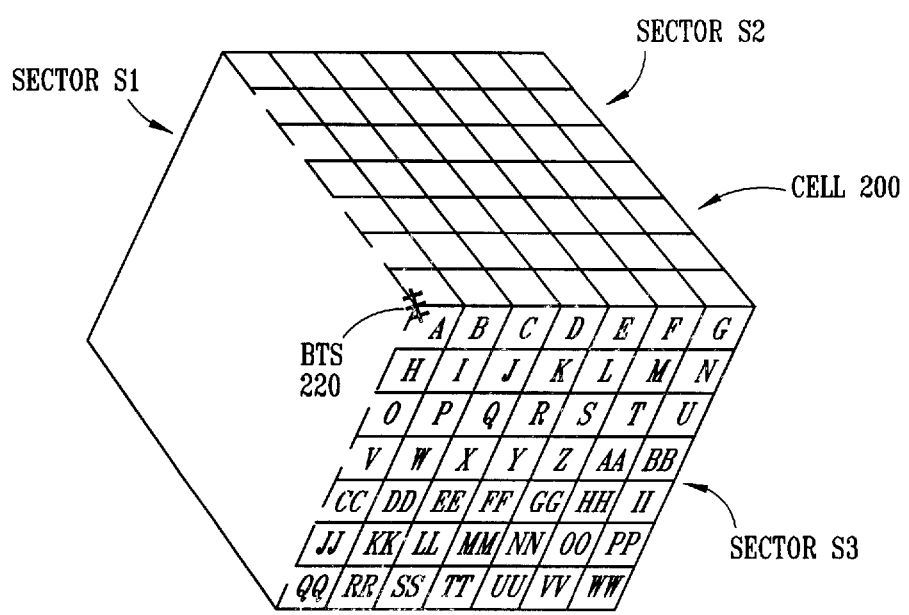
FIG. 10 is a diagram illustrating a cell from which a matrix of information relating to quality of service, power level and location of a mobile station is obtained in accordance with the invention.

Referring now to FIG. 9, methods and means are shown for eliminating incorrect identification of a channel during a hand-off, known as "falsing," utilizing information representing the location and direction of travel of a mobile station C. Mobile station C is shown engaged in an active call within a group of adjacent cells forming a portion of the wireless telecommunications network 40 schematically described and FIG. 2. Such falsing occurs in current IS-136 systems implementing Mobile Assisted Hand-off (MAHO) technology and could occur in other circumstances in which a mobile station seeks to monitor the power level of channels broadcast by an adjacent cell. During an MAHO hand-off, the mobile station C monitors the power level of control channels of adjacent cells and sends such information to the management and control system of the network 40. Based on this information, the management and control system determines which of the adjacent cells is a preferred candidate to receive a hand-off of the call from the serving cell.

Falsing occurs as the mobile station C moves in the direction of the arrow shown, away from cell 70 and behind the shadows of a group of obstructions 80, shielding the signals from the BTS 60 of the cell 70 and the BTS of each adjacent cell, prior to a hand-off. The obstructions 80 could be tall buildings, for example, in the event mobile station C is located in an urban environment. Blocking or shadowing is particularly acute if directional antenna are used, as they typically are, in sectored cells. However, the lack of an obstruction between the BTS 90 of a non-adjacent falsing cell 100 may cause its signal to be monitored by mobile station C at a higher power level than the signals of adjacent cells. If the signal of BTS 90 is at the same frequency as an available control channel of an adjacent cell, such as the cell 70, the management and control system of the network 40 may interpret the power level increase of the signal broadcast by falsing cell 100 as movement of the mobile station C in the opposite direction of travel, towards the cell 70, and attempt to hand-off mobile station C to the cell 70. Because the mobile station C is moving away from the cell 70, an attempted hand-off will result in a dropped call.

Information representing in substantially real-time the direction of travel of the mobile station C can be obtained by the management and control system of the network 30, utilizing the equipment and techniques previously discussed. For example, the MSC of the cell servicing mobile station C will compare the direction of travel information with the "falsing" power level measurement taken by mobile station C. If the direction of travel conflicts with power level measurements taken by the mobile station C during an MAHO, then a determination can be made that the power level measurement is in error and the control channel and its associated cell will be eliminated as candidates for channel assignment and hand-off.

Information representing in substantially real-time the position or location of the mobile station C can assist in avoiding such false measurements and readings. This is accomplished by dividing the serving cell 65 into a grid, representing geographic quadrants 1, 2, 3 and 4. For each of the geographic quadrants within the serving cell 65, a database, lookup table or other suitable memory array is created, identifying the immediately adjacent cells contiguous with the boundary of each quadrant. The management and control system of the network 40, preferably the associated MSC, will recognize only the subset of such adjacent cells mapped to any particular quadrant as acceptable candidates for hand-offs from the serving cell 60 when the mobile station C is located that quadrant. In this manner, readings by mobile station C of channels that are not assigned to the subset of adjacent cells acceptable for hand off from a particular quadrant can be eliminated from determination, triggering and control of an MAHO or other hand-off. The size and number of quadrants utilized for each cell may be selected as needed to address the unique requirements of dense urban areas with heavy shadow losses and ducting effects.

Referring now to FIGS. 10, 11, 12, and 14, methods and means are illustrated for enhancing the quality of service, channel assignment and power level control over channels in a serving cell 200. Cell 200 is typical of other cells and the wireless telecommunications network 40 and includes a BTS 220 and associated MTSO (not shown in FIGS. 10 through 14) which monitors all active channels in discrete time intervals or time-slots. After having served as the central office in completing a call setup, the associated MTSO continues to monitor the radio transmissions of mobile stations served within the cell 200 at prescribed intervals. Cell 200, preferably under the management and control of the associated MTSO, automatically and without substantial interruption, switches traffic and control channels used with mobile stations (not shown) served within the cell 200 to an idle or available channel previously experienced as having the highest quality of service, as defined by the network 40. The power level of transmissions to mobile stations served within the cell 200 is also increased or decreased to enhance the quality of service provided. Mobile stations receiving transmissions within the cell 200 provide information to the BTS 220 representing both the forward and reverse bit error rates (FBER and RBER) and power level of transmissions received. Such information is fed back to the BTS 220 by the mobile stations during active calls, via the traffic channel transmissions.

Information representing the location of each mobile station served by cell 200, as well as the power level, FBER and RBER are monitored by the network 40 to determine and develop a matrix or array of information stored in a suitable memory location within the network 40 to aid in the enhancement of the quality of service and power level assignments of the mobile stations served. Information representing the location of each mobile station within the cell 200 is determined and obtained utilizing any of the equipment and techniques previously discussed with respect to mobile stations A and C. For those mobile stations within the cell 200 utilizing a co-located or coupled GPS receiver, information obtained by the receiver indicating or representing the location of each of such mobile stations is transmitted to the BTS 220 via control channel transmissions as each mobile station travels within the cell 200.

Cell 200 is divided into sectors and S 1, S 2 and S 3, each of which in turn is sub-divided into a grid identifying a preselected number of quadrant locations within the sector in which information representing the power level, bit error rate received by a mobile station is stored in a matrix or array and suitable memory device or devices by the network 40. Development of such a grid of locations monitored within the cell 200 as shown with reference to sectors S 1, S 2 and S 3. Sector S 1 is shown prior to overlay of a location identifying grid. Sector S 2 is shown with a location identifying grid overlay, preferably with boundaries running parallel to the boundaries of sector S 2 and the cell 200. Sector S 3 includes a grid overlay, with each grid location identified alphabetically. It will be apparent that the number and size of the grid locations and the corresponding area and number of locations monitored is selected to avoid excessive channel and power level adjustment yet capable of providing a sufficiently enhanced quality of service.

Information representing the quality of service of calls within the cell 200 for each channel is determined and calculated by the network 40 using information representing the forward and reverse bit error rates of call transmissions within each quadrant of a sector. The mobile station engaged in an active call reports the values of the forward and reverse bit error rates to the BTS 220 every second, via control channel transmissions. A quality index (QI) is determined by the network 40 by calculating and storing the average of the sum of forward and reverse bit error rates of each of one or more prior bit error rate reports, and preferably the preceding 12 reports. This results in a rolling average of the total forward and reverse bit error rates of one or more reports previously received. The number or window of such reports comprising quality index can be adjusted as desired. Thus, the larger the numeric value of the quality index, the less desirable assignment of the associated channel is for the quadrant from which the bit error rates comprising the quality index were obtained.

Information representing the average power level (PL) of one or more channels transmitted to a mobile station in each quadrant is preferably determined by determining a rolling call power level average for each call and is measured by the mobile station at one second intervals during a call. A power level average for each channel in a quadrant is determined by averaging a number of call power level averages of prior calls. Preferably, five prior call power level averages would be averaged to determine a PL for a channel in a quadrant.

FIG. 11 illustrates an array or matrix 240 developed and stored in memory within the network 40 to track the quality index and power level average for each of channels 1 through "n" as each is used in each of the quadrants A through WW of sector S 3 of the cell 200. Each of the channels is listed in the matrix 240 by column and each quadrant of sector S 3 is listed by row. The matrix also contains pointers establishing a list of channels available for use in each sector, ordered with reference to the quality index of each channel. Preferably, channels are placed in an order beginning with the quality index indicating the highest level of quality of service (corresponding to the lowest numerical value of quality index) to the quality index indicating the lowest level of quality of service (corresponding to the highest numerical value of quality index).

The matrix 240 is accessed by the network 40 as a mobile station requests or receives a call within a quadrant or travels into the quadrant while engaged in an active call. In any of such events, an available or idle channel with the quality index indicating the highest quality of service is assigned to the call. When a channel listed for a quadrant in the matrix 240 is unavailable, the variable "next" points to the next best channel for that quadrant, as determined by the quality index. Utilizing such pointers, an array is developed for each quadrant, with the channel having the highest quality of service listed at the head of a linked list. Each channel points to the next best channel, in this fashion. This is done for each quadrant. As a channel is used in a quadrant, it is removed from the linked list. As a channel becomes available, it is inserted into the ordered linked list in the appropriate position, with reference to its quality index.

As mobile station travels into another within the sector S 3 in which the channel currently assigned in an active call has a quality of service lower than a predetermined acceptable limit (i.e., the quality index is higher than a predetermined limit), the call is switched by the network 40 to the channel having the highest quality. A quadrant is considered a "bad spot" for a particular channel if the quality index exceeds the predetermined limit. A determination that a quadrant is a "bad spot" for a channel triggers a hand off. Similarly, the power level average associated with each channel and quadrant in the matrix 240 is accessed by the network 40 at the time of channel assignment and the power level of the channel is adjusted to the power level average maintained in the matrix 240.

Such use of a call the index and power level average of the matrix 240 allows prediction of channel and power level assignment and selection, with reference to the prior quality of service, to enhance or optimize the quality of service. In addition to average power level information, a trend designation is also implemented to identify quadrants in which the power level of each channel is increasing, decreasing or remaining the same. This trend indicator could be used to allow the power level prediction to be more reactive to current conditions.

Referring to FIG. 12, there is shown a flow diagram 300 illustrating channel and power level assignment by the network 40 with reference to the quality index and power level average. Also illustrated is updating the matrix 240 with bit error rate and power level information during a call. In step 320, the network 40 receives location information by the means and techniques previously discussed and identifies the quadrant of a matrix developed for the particular cell or sector in which the mobile station is located. In step 340, the network 40 finds the best available channel for that quadrant, with reference to the linked list of channels developed for that quadrant. In step 360, the network 40 assigns the first available channel, with the highest quality of service ranking from the linked list.

Steps 370 and 380 are performed with a predetermined frequency during an active call, to update the matrix 240 with bit rate error and power level information for the channel and use. Specifically, in step 370 forward and reverse bit error rate and power level information is gathered from the mobile station and the associated BTS. Using such information, the quality index and power level average are determined by the network 40 the matrix 240 is updated in step 380. In step 390, the network 40 determines whether the active call is complete and if not, steps 370 and 380 are repeated. Steps 370 and 380 are repeated until the call is completed.

FIG. 13 illustrates a flow diagram 400 showing the steps implemented by network 40 when an active call moves to a new quadrant or a call is initiated. Specifically, in step 405 a determination is made with reference to information representing the location of a mobile station of whether the mobile station is moving into a new quadrant. If not, steps 370, 380 and 390 are performed as shown in FIG. 12. If the mobile station is moving to a new quadrant, in step 410 the matrix 240 is accessed to determine the correct power level assignment for the channel in use. If the power level indicated by the matrix 240 for the channel in use within the new quadrant is below a predetermined level, or the quality index for the channel is above a predetermined level, in step 420, a determination is made that the quadrant is a "bad spot" for the channel in use. In the event of a "bad spot" determination, in step 430 a hand-off his performed to the next available channel in the linked list of channels for that quadrant. If a "bad spot" is not determined in step 420, a determination is then made in step 440 with reference to the power level average for the channel in matrix 240 of whether the power level of transmission should be changed. For example, no change will be required if transmissions are currently at the power level average indicated by the matrix 240. If, however, a power level change is indicated in step 440, the power level of transmission is adjusted in step 460 as indicated by the matrix 240.

Figure 14:
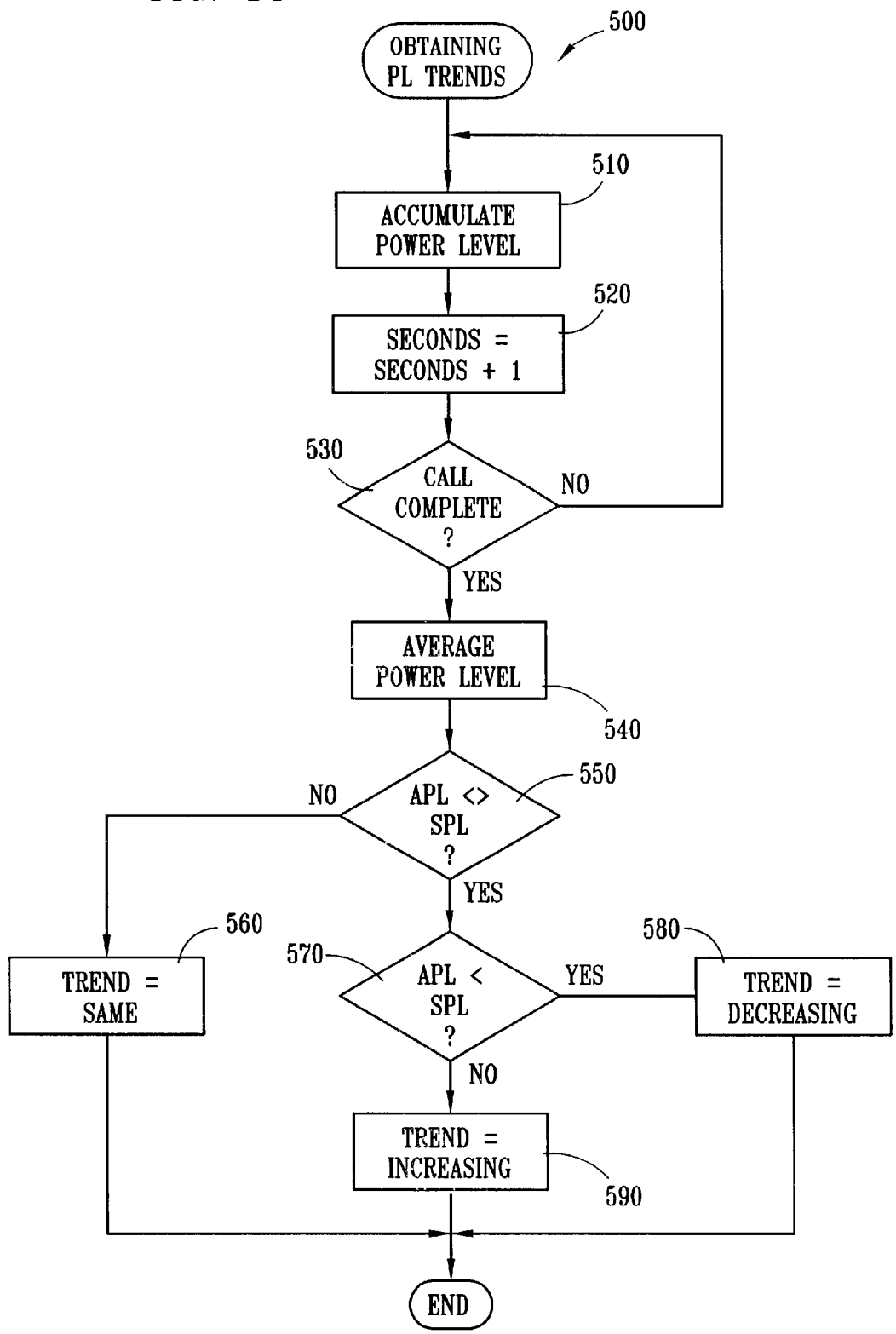
FIG. 14 is a flow diagram illustrating determination of power level information concerning a mobile station in accordance with the invention.

FIG. 14 is a flow diagram 500 illustrating the method by which power level trends are determined for each channel of each quadrant of the matrix 240.

Steps 50, 520 and 530 together develop an average call power level used by a channel during a call. Step 510 accumulates in a memory the readings of the power level at one second intervals during a call. Steps 510 and 520 are repeated until the call is completed, as determined in step 530. A call is considered completed when terminated or the call is handed-off to another channel. The average call power level is determined for the call in step 540. This average call power level is used to determine the average level for a channel in a quadrant previously discussed. The average call power level of preferably five preceding calls over a channel within the same quadrant are averaged to yield the average power level previously discussed.

Trend information is determined in steps 550, 560, 570, 580 and 590. In step 550, the average call power level (APL) is compared to the starting power level, (SPL), which is assigned the channel when the channel is first placed in use. If the two values are the same, a determination is made that the trend is the "same." If the APL and SPL differ, in step 570 an additional comparison is made. If the APL is less than the SPL, a determination is made in step 580 that the power level trend is "decreasing." If the APL is greater than the SPL, a determination is made in step 590 that the trend is "increasing." This trend information is stored in a separate field for each sector and channel within the matrix 240 and is used to assist in the identification of "bad spots" for each channel in each quadrant.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method of controlling a hand-off of an active call from a serving cell of a wireless telecommunications system comprising:

providing information representing the identity of a sector of a cell in which a mobile station conducting the call is located;

providing information representing the identity of channels used by one or more cells adjacent the sector;

eliminating from a mobile assisted hand-off list utilized by the mobile station the identity of channels not available in the one or more cells adjacent the sector in which the mobile station is located;

determining the direction of travel of the mobile station;

determining if the power level of a transmission from a first sector received by the mobile station conflicts with the direction of travel of the mobile station; and upon determining that the power level of the mobile station conflicts with the direction of travel, eliminating from a mobile assisted hand-off list the first sector.

2. The method of claim 1, wherein the step of providing information representing the identity of the sector of a cell in which the mobile station is operating includes information obtained from a GPS server.

3. The method of claim 1, wherein the step of providing information representing the identity of a sector of a cell includes information extracted from a table identifying the one or more cells adjacent the sector and the identity of channels used by each of the one or more cells adjacent the sector.

* * * * *